(12) United States Patent
Schleiffer et al.

(10) Patent No.: US 9,951,282 B2
(45) Date of Patent: Apr. 24, 2018

(54) PROCESS FOR INTRODUCING FINE AND COARSE ADDITIVES FOR HYDROCONVERSION OF HEAVY HYDROCARBONS

(71) Applicants: BP Europa SE, Hamburg (DE);
Kellogg Brown & Root LLC, Houston, TX (US)

(72) Inventors: Andreas Schleiffer, Lauenbrück (DE); Anand Subramanian, Sugarland, TX (US)

(73) Assignees: BP EUROPA SE, Hamburg (DE); KELLOGG BROWN & ROOT LLC, Houston, TX (US)

( * ) Notice: Subject to any disclaimer, the term of this patent is extended or adjusted under 35 U.S.C. 154(b) by 18 days.

(21) Appl. No.: 14/774,587

(22) PCT Filed: Mar. 14, 2013

(86) PCT No.: PCT/US2013/031321
§ 371 (c)(1),
(2) Date: Sep. 10, 2015

(87) PCT Pub. No.: WO2014/142874
PCT Pub. Date: Sep. 18, 2014

(65) Prior Publication Data
US 2016/0032198 A1 Feb. 4, 2016

(51) Int. Cl.
*C10G 47/26* (2006.01)
*C10G 75/04* (2006.01)
*B01J 8/00* (2006.01)
*C10G 47/22* (2006.01)

(52) U.S. Cl.
CPC .............. *C10G 47/26* (2013.01); *B01J 8/008* (2013.01); *C10G 47/22* (2013.01); *C10G 75/04* (2013.01); *C10G 2400/02* (2013.01); *C10G 2400/04* (2013.01); *C10G 2400/08* (2013.01)

(58) Field of Classification Search
CPC ........ C10G 47/26; C10G 75/04; C10G 47/22; C10G 2400/04; C10G 2400/08; C10G 2400/02; B01J 8/008
See application file for complete search history.

(56) References Cited

U.S. PATENT DOCUMENTS

| | | | |
|---|---|---|---|
| 4,433,947 A * | 2/1984 | Kratzer | C10G 1/083 208/81 |
| 4,851,107 A | 7/1989 | Kretschmar et al. | |
| 4,941,966 A | 7/1990 | Merz et al. | |
| 5,064,523 A | 11/1991 | Kretschmar et al. | |
| 5,624,547 A | 4/1997 | Sudhakar et al. | |

(Continued)

OTHER PUBLICATIONS

Smith ("Chemical Process Design and Integration", 2005, Published by McGraw Hill, p. 297).*

(Continued)

*Primary Examiner* — Brian A McCaig
*Assistant Examiner* — Jason Y Chong
(74) *Attorney, Agent, or Firm* — Brinks Gilson & Lione

(57) ABSTRACT

A process for slurry-phase hydrocracking of a heavy hydrocarbon feedstock in a reactor, such as an upflow bubble column reactor, includes separately introducing additive in two size ranges into the feedstock. A fine size particle additive is introduced upstream of a coarse size particle additive.

23 Claims, 1 Drawing Sheet

(56) References Cited

U.S. PATENT DOCUMENTS

| | | |
|---|---|---|
| 6,660,157 B2 | 12/2003 | Que et al. |
| 2006/0272983 A1* | 12/2006 | Droughton ............ C10G 25/003 208/177 |
| 2009/0134064 A1 | 5/2009 | Reynolds |
| 2009/0299112 A1 | 12/2009 | Bauer et al. |
| 2011/0210045 A1 | 9/2011 | Kou et al. |
| 2011/0226667 A1 | 9/2011 | Lott et al. |
| 2011/0308997 A1 | 12/2011 | Bhattacharyya et al. |

OTHER PUBLICATIONS

International Search Report for corresponding International application No. PCT/US2013/031321 dated May 30, 2013.
Motaghi, M., et al., "Slurry-phase hydrocracking-possible solution to refining margins," Hydrocarbon Processing, Feb. 2011, 4 pgs.
Written Opinion for corresponding International application No. PCT/US2013/031321 dated May 30, 2013.

\* cited by examiner

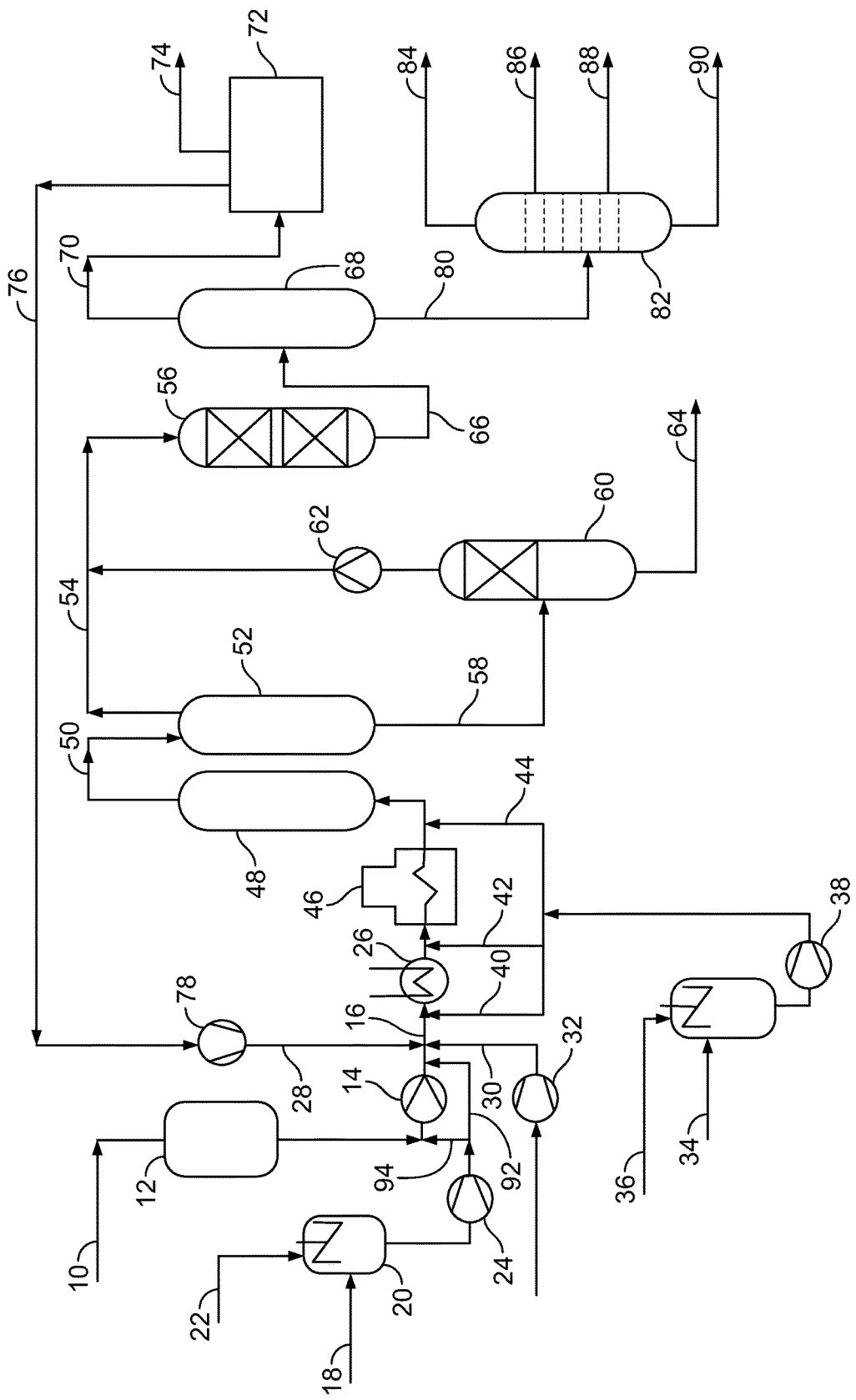

PROCESS FOR INTRODUCING FINE AND COARSE ADDITIVES FOR HYDROCONVERSION OF HEAVY HYDROCARBONS

CROSS-REFERENCE TO RELATED APPLICATIONS

This application is a U.S. National Stage application of PCT Application No. PCT/US2013/031321, filed on Mar. 14, 2013.

BACKGROUND

1. Field of the Invention

The invention is related to a process for the thermal hydrogenation conversion of heavy hydrocarbon feedstocks.

2. Description of the Related Art

As the world's supply of crude oil becomes heavier and contains higher sulfur levels, there is a challenge is to meet the growing demand for light, high-quality, low-sulfur transportation fuels. The upgrading of heavy hydrocarbon feedstocks may help to meet this demand. Several processes are useful for upgrading heavy hydrocarbon feedstocks. One such process is known as slurry phase hydrocracking. Slurry-phase hydrocracking converts any hydrogen and carbon containing feedstock derived from mineral oils, synthetic oils, coal, biological processes, and the like, hydrocarbon residues, such as vacuum residue (VR), atmospheric residue (AR), deasphalted bottoms, coal tar, and the like, in the presence of hydrogen under high temperatures and high pressures, for example, from about 750° F. (400° C.) up to about 930° F. (500° C.), and from about 1450 psig (10,000 kPa) up to about 4000 psig (27,500 kPa), or higher. To prevent excessive coking during the reaction, finely powdered additive particles made from carbon, iron salts, or other materials, may be added to the liquid feed. Inside the reactor, the liquid/powder mixture ideally behaves as a single homogenous phase due to the small size of the additive particles. In practice, the reactor may be operated as an up-flow bubble column reactor or as a circulating ebullated bed reactor and the like with three phases due to the hydrogen make up and light reaction products contributing to a gas phase, and larger additive particles contributing to a solid phase, and the smaller additive particles, feedstock and heavier reaction products contributing to the liquid phase, with the combination of additive and liquid comprising the slurry. In slurry phase hydrocracking, feedstock conversion may exceed 90% into valuable converted products, and even more than 95% when a vacuum residue is the feedstock.

One example of slurry phase hydrocracking is known as Veba Combi-Cracking™ (VCC™) technology. This technology operates in a once through mode where in one embodiment of the process, a proprietary particulate additive is added to a heavy feedstock, such as VR, to form a slurry feed. The slurry feed is charged with hydrogen and heated to reactive temperatures to crack the vacuum residue into lighter products. The vaporized conversion products may or may not be further hydrotreated and/or hydrocracked in a second stage fixed bed catalyst reactor. It produces a wide range of distillate products including vacuum gas oil, middle distillate (such as diesel), naphtha and light gas.

It has been disclosed in various literature that the particulate additive for slurry phase hydrocrackers may include a wide range of materials. These materials reportedly include, but are not limited to, catalyst, red mud, iron (III) oxide, blast furnace dust, activated coke from hard coal or lignites, carbon black (soot), ashes from gasification processes of crude oil, silicon oxides and other inorganic minerals containing iron, such as laterite or limonite. The particulate additives are reported to have a wide particle size distribution between 0.1 and 2,000 microns, with a preference towards to lower to middle of the range. It has been reported that it is desirable to include between 10 and 40 wt % (weight percent) of the particles above 100 microns in size, with the balance of particles below 100 microns in size. To achieve finer control on the particle size distribution of the additive introduced into the process, a system has been proposed for introducing a fine particle size range and a coarse particle size range of additives separately into a mixing tank containing feed to obtain finer control on the relative size distribution of the additives mixed in with the feedstock. The slurry feedstock is then introduced into the high pressure pre-heat train with hydrogen and introduced into a reactor. See, e.g., U.S. Pat. No. 4,851,107, to Kretschmar et al. which is incorporated herein by reference.

Despite the various processes and alternatives available for upgrading heavy hydrocarbons, there is still a need for improving the existing processes to benefit the economics, efficiency and effectiveness of the unit operations.

SUMMARY

A process for slurry-phase hydrocracking of a heavy hydrocarbon feedstock in a reactor, including an upflow bubble column reactor includes separately introducing additive in two size ranges into the feedstock. A fine size range particle additive is introduced in to the process upstream of a coarse size range particle additive. The process includes introducing a first additive to the feedstock to form a fines-loaded feedstock downstream of the feed charge pump. The fines additive may include particles having a median particle size distribution from 20 to 500 microns and a surface area from 100 m²/g to 800 m²/g. Separately, a second additive is introduced to the fines-loaded feedstock downstream of a feed charge pump and upstream of or into the hydrocracking upflow bubble column reactor. The second additive may include coarse particles having a median particle size from 400 to 2,000 microns. The reaction products are removed from the reactor, such as an upflow bubble column reactor, for further processing.

BRIEF DESCRIPTION OF THE DRAWINGS

The FIGURE represents a simplified process flow diagram of a slurry phase hydrocracking process unit illustrating one embodiment of the present invention.

DETAILED DESCRIPTION OF THE PREFERRED EMBODIMENTS

In a slurry phase hydrocracking process with any reactor configuration including but not limited to an upflow bubble column reactor, one or more additives may be introduced into the feedstock that results in several beneficial effects. Without being bound by any theory that is provided for illustrative purposes in this description, it is believed that an additive with high surface area, such as porous particles, allows the adsorption of asphaltene coke precursors formed during the exothermic thermal hydrocracking reaction of the feedstock. This allows removal of the coke precursors on the additive with the reaction products rather than allowing the coke precursors to deposit on the equipment internals, such as the exchangers and furnace in the preheat train, and on the reactor internal surfaces. Preferably, for this beneficial effect, the additive particles exhibit a surface area greater than 100 meters-squared per gram ($m^2/g$) or more preferably greater than 200 $m^2/g$.

In addition, it is believed that an additive with a sufficiently large particle size improves the hydrodynamics of the reactor, including but not limited to an upflow bubble reactor. It is believed that the large particles assist in maintaining a turbulent backflow eddy recirculation in the reactor to achieve better mixing and more homogenous reaction kinetics. It is believe that the larger size additive particles also assist with the breakdown of foam that may form in the reactor, further improving the reactor performance. Preferably, for this beneficial effect in the reactor, the large additive particles have a median particle size between about 400 microns and 2000 microns. Thus, an ideal additive for all the beneficial effects noted would preferably have a relatively high surface area per weight, broad range of size and density for improved flow characteristics and reactor hydrodynamic performance. However, the particles should not be so large or dense that they settle out of the slurry feedstock flowing through the feed pre-heat train or the reactor.

Rather than use one ideal additive, two additives with different characteristics may be useful. The two additives are introduced at separate points in the feed circuit to take advantage of the attributes of the particles, and minimize disadvantages that might accompany introducing all the additive with the initial feedstock charge. A first additive, referred to as "fines additive," of a smaller median particle size referred to as "fines particles," or "fines additive particles," that is highly porous with a high internal surface area is first introduced into the feedstock. The fines additive may be introduced either in a feed mixing vessel, or it may be blended with a slurry oil that may be a portion of the feedstock or any other liquid containing stream such as a high aromatic oil, such as light cycle oil, heavy cycle oil, or recycle heavy vacuum gas oil (VGO) from the VCC vacuum tower and the like. The fines additive may be introduced into the main feed circuit immediately upstream of the feed preheat train, either upstream or downstream of the feed charge pump. The fines additive may be optimized for adsorption of the asphaltene coke precursors generated during the heat up and hydrocracking reaction. It is believed that the surface area of the fines additive particles is a key variable.

A second additive referred to as "coarse additive," of a larger median particle size referred to as "coarse additive particles," is then introduced into the fines-loaded feedstock at one or more locations along the feed preheat train. The feed preheat train may include one or more feed heat exchangers, gas heat exchangers, feed-effluent heat exchangers and a feed preheat furnace upstream of the slurry hydrocracking reactor. The coarse additive may be introduced before, between or after the feed heat exchangers or gas heat exchangers, or feed-effluent heat exchangers. The coarse additive may be introduced before or after the feed preheat furnace. The coarse additive may also or alternatively be introduced into the reactor inlet with the fines-loaded feedstock. Preferably, the coarse additive is introduced after the feed preheat furnace. The coarse additive may be optimized for improved hydrodynamic performance of the reactor and foam minimization. By introducing the coarse additive into or immediately upstream of the reactor, the lag time between adjustments to coarse additive injection and reactor performance is reduced. Also, depending on the nature of the coarse additive, such as density and hardness, by introducing the coarse additive downstream of the preheat train equipment, additive particles settling and equipment erosion may be avoided.

The fines additive particles may have a smaller particle size range than the coarse additive particles, and may have a lower, the same, or higher surface area per unit weight. The fines additive may preferably have a particle size distribution between 20 microns and 500 microns. Below this size, it is believed that it may be difficult for the smaller particles to be removed by a cyclone separator in the hot separator. In one aspect, the maximum particle size limit is not critical but is beneficial if controlled. There may be some overlap at the large size range of the fines additive with the small size range of the coarse additives. However, if the first additive particles are too large it is believed that there may be settling of the particles in the feed preheat train exchangers. Preferably, the fines additive may have a maximum particle size nominally of 400 microns. That is to say, that the fines additive may have been passed through a sieve to retain particles greater than 400 microns, but due to the irregular shapes of the individual additive particles, it is possible that up to 5 wt % of the total particles passing through the 400 micron sieve may be larger than 400 microns in one dimension. It is believed that particles as large as 450 microns or 500 microns may possibly be passed by such a screening operation. Even up to 10 wt % of fine particles may be greater than 400 microns, although, preferably, there is a cut-off at about 450 microns. If the large end of the particle size distribution of the fines additive is too much, or too large, it is believed that this may cause problems due to the larger additive particles settling out in the feed preheat equipment, or causing erosion problems in the centrifugal feed pump and possibly the heat exchangers. Preferably, the fines additives particles are greater than 25 microns. More preferably the fines additive particles are greater than 50 microns. It is expected that the fines additive particles may have a broad nominal size distribution between the minimum and maximum sizes having either a short tail or a sharp cut-off at either end with a peak (or median particle size) at about 100 microns, about 150 microns or about 200 microns, or preferably anywhere between about 100 microns and about 200 microns.

The fine additive particles preferably have a porosity that provides a surface area sufficient to adsorb the coke precursor asphaltene molecules. It is believed that the fines additive particles should have sufficient porosity to provide an average surface area of at least 100 $m^2/g$, and preferably at least 200 $m^2/g$, as previously reported for additives in slurry phase hydrocracking processes.

The coarse additive particles may have a larger particle size range compared to the fines additive particles. The coarse additive particles may have a minimum size of 400 microns and a maximum size of 2,000 microns. In one aspect, the minimum particle size limit is not critical but beneficial if controlled. There may be some overlap at the small size range with the large sizes of the fines additive. However, it is believed that the coarse additive if it is too small does not provide the beneficial hydrodynamic effects in the reactor. Therefore, additional energy is expended handling coarse additive particles that are too small. Likewise, additive particles that are too large or too heavy may settle in the reactor and not provide the beneficial hydrodynamic effects, which are believed to be directly related to the reactor dimensions. Therefore, it is preferred that the coarse additive particles have median particle size of about 800 microns for smaller commercial reactors (about 10,000 barrels per day of feed or smaller), about 1,200 microns for medium size commercial reactors (about 20,000 barrels per day of feed), and about 1,600 microns or larger for large size commercial reactors (about 30,000 barrels per day of feed or larger). However, the actual optimal median particle size depends also on the reactor space velocity, coarse additive material properties (e.g., density), feedstock, pump handling limitations, and other operational variables.

The ratio of fines additive to coarse additive may be adjusted for optimal operation. Preferably, the amount of coarse additive is between 10 wt % and 40 wt % based on total weight of combined additive introduced into the process. More preferably, the amount of coarse particles is between 15 wt % and 25 wt % of the combined additive. Even more preferably the amount of coarse particles is about 20 wt % of the combined additive. The amount of coarse additive may fluctuate over time as adjustments are made by operators to maintain a desired slurry density and pressure differential across the slurry reactor, including an upflow bubble column reactor.

Preferably, the amount of fines additive is between 60 wt % and 90 wt % of the combined additive introduced to the process More preferably, the amount of fines particles is between 75 wt % and 85 wt % of the combine additive. Even more preferably, the amount of fines particles is about 80 wt % of the combined additive at steady state operations.

The fines additive may be introduced into the feedstock either via the feed mixing tank or directly into the main feed line in an amount of between about 0.1 wt % to 5 wt % of total feed. Preferably, less than 2.5 wt % of fines additive is introduced. More preferably not more than about 2 wt % of fines additive is introduced to the feedstock. Preferably, not less than 0.1 wt % of fines additive is introduced. When introduced directly into the main feed line, the fines additive is pre-mixed with a liquid, preferably an oil in a slurry drum to form an additive slurry. The fines additive slurry may contain between 0.1 wt % and 60 wt % total solids in the mixing drum. Preferably, the fines additive slurry contains from 10 wt % to 50 wt % total solids, and more preferably from 30 wt % to 50 wt % total solids in the additive mixing drum.

The coarse additive may be introduced into the feedstock either via the feed mixing tank or directly into the process in an amount of from about 0.05 wt % to 5 wt % of total feed. Preferably, less than 2.5 wt % of coarse additive is introduced. More preferably not more than about 2 wt % of coarse additive is introduced to the feedstock. Preferably, not less than 0.05 wt % of coarse additive is introduced. When introduced directly into the process, the coarse additive is pre-mixed with a liquid, preferably an oil in a slurry drum to form an additive slurry. The coarse additive slurry may contain between 0.1 wt % and 60 wt % total solids in the mixing drum. Preferably, the coarse additive slurry contains from 10 wt % to 50 wt % total solids, and more preferably from 30 wt % to 50 wt % of the total solids in the additive mixing drum.

Additives may be made of the following materials, some of which may be known to those skilled in the art and have been described in the literature relating to slurry phase hydrocracking. It has been disclosed that the particulate additive for slurry phase hydrocrackers may include a wide range of materials. It is expected that these materials may be modified to meet the above characteristics of the fines additive and coarse additive. The material selected for the fines additive may be the same or different than the material selected for the coarse additive. These materials reportedly include, but are not limited to, hydrotreating catalyst, spent catalysts, zeolites, red mud, iron (III) oxide, blast furnace dust, activated coke from hard coal or lignites, ashes from gasification processes and other inorganic minerals containing iron. Preferably, the fines additive particles are selected from materials that include carbon. Preferably, the large particles have some porosity to limit their apparent density to avoid settling of the particles. Preferably, activated carbon-based materials such as activated coal may be selected for both fines additives and coarse additives.

The feedstock may be the following material: mineral and synthetic oil, heavy oils, residual oils, waste oils, shale oils, used oils, tar sand oils, coal oils such as oils derived from coal pyrolysis, coal tars such as tars derived from coal liquifaction, vacuum residue, atmospheric residue, deasphalted bottoms, comminuted coal, or other heavy oils derived from any source, such as petroleum, and mixtures thereof, as well as biomass derived materials, including lignin and pyrolysis oils. Lignin liquefies upon heating and up to 30 wt % may be blended with a heavy oil feedstock, such as vacuum residue. Preferably the feedstock may include vacuum residue having a boiling temperature greater than 500° C.

Referring to FIG. 1, a simplified hydrocracking process unit process flow diagram illustrates one embodiment of the invention. A vacuum residue feedstock 10 is introduced into a slurry feed surge drum 12. The feedstock from the feed surge drum is taken by the feed pump 14 and introduced into the high pressure feed circuit 16. The fines additive 18 is introduced into the slurry mixing tank 20. This fines additives slurry may include from 0.1% to 60% by weight additive, preferably 10 wt % to 50 wt % and more preferably about 30 wt % to 50 wt % additive, with the balance being a slurry oil 22 or heavy oil carrier, such as vacuum residue if such is used as the feedstock. The fines additive solids, is introduced via a slurry pump 24 into the feedstock high pressure feed circuit 16 via a fines feed stream 92. Alternatively, the fines additive may be introduced upstream of the feed pump 14, via an alternative fines feed stream 94, preferably in an amount less than 2 wt % of the feedstock by weight, in which case due to the small particle size and low solids concentrations, the feed pump 14 may be a centrifugal pump. The feedstock with the fines additive in the high pressure feed circuit 16 is introduced to the feed preheat exchanger 26. The preheat exchanger 26 may comprise one or more heat exchangers. For improved process heat efficiency, these preheat exchangers are feed-effluent exchangers, whereby heat is recovered from the 2nd stage catalytic hydroprocessing reactor effluent, the hot separator overhead effluent, or other high temperature energy sources from within or external to the process unit. Upstream of the preheat exchanger 26 the recycle gas 28 and the makeup gas 30 are introduced into the high pressure feed circuit. Hydrogen is introduced to the makeup gas compressor 32, and then the high pressure make-up hydrogen 30 may be first introduced to the recycle gas 28 to form a treat gas before being introduced into the high pressure feed circuit 16.

Another stream of additive material is made into slurry by mixing a range of coarse particle size additive 34 with a slurry oil 36, or heavy oil carrier, such as vacuum residue if such is used as the feedstock. The coarse additive slurry may include from 0.1% to 60% by weight additive, preferably from 10 wt % to 50 wt % and more preferably from about 30 wt % to 50 wt % additive, with the balance being a slurry oil or heavy oil carrier, such as vacuum residue if such is used as the feedstock. The percentage of coarse additive may vary depending on the solids loading capability of the coarse additives pump 38, which may be a slurry-capable piston pump, though it is desirable to have as high as solids loading as practical. The coarse additives slurry may be added to the fines-loaded feedstock via line 40 upstream of the preheat exchanger 26. Alternatively, the coarse additives slurry may be added via line 42 after the preheat exchanger 26 and upstream of the furnace 46, or via line 44 after the furnace directly to the inlet to the first stage gas phase reactor 48, or directly into the reactor 48. The coarse additives slurry may be introduced at any place along the feed preheat train. Because the feed preheat train includes several exchangers and a furnace, there are multiple locations where the coarse additive slurry may be introduced. Because coke precursors are formed as soon as the vacuum residue begins heating up, it may be desirable to introduce the course additives slurry upstream of the preheat train. Alternatively, to minimize erosion of the exchanger and heat exchanger or furnace the equipment that may be desirable to introduce the course additives slurry at a later point and rely upon the fines additives to adsorb the coke precursors formed upstream of the coarse additive injection point.

The effluent stream 50 from the slurry phase reactor 48 is introduced into a hot separator 52. The reaction products 54 are removed from the top of the hot separator 52 and introduced into the second stage reactor 56, such as a second stage catalytic hydroprocessing reactor, for further processing, such as hydrotreating and/or hydrocracking. The bottoms 58 from the hot separator, which may be primarily unconverted residue are introduced into a vacuum column 60. The overhead product stream of the vacuum column is introduced into a pump 62 and then fed to the second stage reactor 56. The vacuum column bottom stream 64 may be a heavy vacuum residue that may be recycled into the feedstock of this unit, or may be used for other products, such as pitch or asphalt. The effluent 66 from the second stage reactor is introduced into the cold separator 68. The hydrogen, off gases, sulfur and other gases, are recovered from the top of the cold separator through line 70 and introduced to a gas cleaning unit 72. Off gases, sulfur compounds and other undesirable components may be removed through line 74 and sent for further processing or disposal. The hydrogen and other light gas is sent as recycle gas through line 76 to the recycle gas compressor 78 and recycled back into the feedstock.

The bottoms stream 80 from the cold separator 68 is sent to a fractionator column 82. In the fractionator column 82, a variety of product fractions may be removed such as propane and other like gases through line 84, naphtha through line 86, a middle distillate cut through line 88, and a vacuum gas oil line 90 from the bottom of the fractionator column.

The process may be modified with different additives optimized for different feedstocks with a finer level of control because of the separate additive feed control systems, and the reduced lag time by injecting the coarse additive directly into the reactor or closer upstream to the reactor compared to where the fines additive is introduced. Because additive of a larger particle size may be too erosive for use with a centrifugal pump, embodiments of the invention may also provide the advantage that a centrifugal pump may be used for fines-loaded feedstock, and a smaller piston pump for the coarse additive slurry. This is economically advantageous compared to a single large feed piston pump when the mixing feed tank has a single broad particle size additive used encompassing both the fines and coarse particle size distribution.

One of ordinary skill in the art may appreciate other advantages and modifications of the above described embodiments based on the teachings herein. However, the above embodiments are for illustrative purposes only. The invention is defined not by the above description but by the claims appended hereto.

What is claimed is:

1. A process for slurry-phase hydrocracking of a heavy hydrocarbon feedstock in a slurry phase hydrocracking reactor, the process comprising:
   introducing a first additive to the feedstock upstream of a feed charge pump and upstream of a pre-heat exchanger to form a fines-loaded feedstock, the first additive comprising fines particles having a median particle size between 100 microns and 200 microns;
   separately introducing a second additive to the fines-loaded feedstock downstream of the feed charge pump and upstream of the slurry phase hydrocracking reactor, the second additive comprising coarse particles having a median particle size between 400 microns and 2,000 microns; and
   removing reaction products from the slurry phase hydrocracking reactor.

2. The process of claim 1, wherein the slurry phase hydrocracking reactor is an upflow bubble column reactor.

3. The process of claim 1, wherein the slurry phase hydrocracking reactor is a circulating ebullated bed reactor.

4. The process of claim 1, wherein the heavy hydrocarbon feedstock comprises of a mineral oil, synthetic oil, heavy oil, residual oil, waste oil, shale oil, used oil, tar sand oil, coal oil, coal tar, vacuum residue, atmospheric residue, deasphalted bottoms, comminuted coal, biomass-derived materials, and mixtures thereof.

5. The process of claim 1, wherein the heavy hydrocarbon feedstock comprises vacuum residue.

6. The process of claim 1, wherein the first additive is introduced to the feedstock in a feed mixing vessel.

7. The process of claim 1, wherein the second additive is introduced to the fines-loaded feedstock immediately upstream of the pre-heat exchanger in a feed preheat train.

8. The process of claim 1, wherein the second additive is introduced to the fines-loaded feedstock immediately upstream of a feed furnace in a feed preheat train.

9. The process of claim 1, wherein the second additive is introduced immediately upstream of the slurry phase hydrocracking reactor.

10. The process of claim 1, wherein the second additive is introduced at a feed inlet of the slurry phase hydrocracking reactor.

11. The process of claim 1, wherein the second additive is introduced at a feed inlet of a second or subsequent slurry phase hydrocracking reactor when multiple reactors in series are employed.

12. The process of claim 1, wherein the first additive comprises 0.1-5 wt % of said fines-loaded feedstock.

13. The process of claim 1, wherein the first additive comprises less than 2.5 wt % of said fines-loaded feedstock.

14. The process of claim 1, wherein the first additive comprises less than 1 wt % of said fines-loaded feedstock.

15. The process of claim 1, wherein the first additive comprises activated carbon.

16. The process of claim 1, wherein the first additive comprises modified activated carbon.

17. The process of claim 1, wherein the second additive comprises activated carbon.

18. The process of claim 1, wherein the second additive comprises modified activated carbon.

19. The process of claim 1, wherein the first additive comprises of one or more of hydrotreating catalyst, spent catalyst, red mud, iron (III) oxide, blast furnace dust, activated coke from hard coal or lignites, carbon black (soot), ashes from gasification processes of crude oil, silicon oxides, other inorganic minerals containing iron, and mixtures thereof.

20. The process of claim 1, wherein the second additive comprises of one or more of hydrotreating catalyst, spent catalyst, red mud, iron (III) oxide, blast furnace dust, activated coke from hard coal or lignites, carbon black (soot), ashes from gasification processes of crude oil, silicon oxides, other inorganic minerals containing iron, and mixtures thereof.

21. The process of claim 1, wherein the second additive comprises a median particle size between 800 microns and 1,200 microns.

22. The process of claim 1, wherein the first additive comprises between 60 wt % and 90 wt % of total first and second additives.

23. The process of claim 1 wherein the heavy oil feedstock comprises a vacuum residue and between 1 wt % and 30 wt % lignin.

* * * * *